United States Patent [19]

Woodworth

[11] 4,438,472

[45] Mar. 20, 1984

[54] ACTIVE ARC SUPPRESSION FOR SWITCHING OF DIRECT CURRENT CIRCUITS

[75] Inventor: George K. Woodworth, Manassas, Va.

[73] Assignee: IBM Corporation, Armonk, N.Y.

[21] Appl. No.: 406,744

[22] Filed: Aug. 9, 1982

[51] Int. Cl.[3] .............................................. H02H 7/22

[52] U.S. Cl. ...................................... 361/13; 307/134; 361/2

[58] Field of Search ...................... 361/2, 3, 5, 6, 8, 9, 361/13, 58, 100, 101; 307/134, 135, 247 A, 549

[56] References Cited

U.S. PATENT DOCUMENTS

| | | | |
|---|---|---|---|
| 2,958,808 | 11/1960 | Miller . | |
| 3,075,124 | 1/1963 | Bagno . | |
| 3,184,619 | 5/1965 | Zydney . | |
| 3,588,605 | 6/1971 | Casson | 361/13 |
| 3,870,905 | 3/1975 | Chikazawa | 307/247 A |
| 3,912,941 | 10/1975 | Passarella . | |
| 4,250,531 | 2/1981 | Ahrens . | |

FOREIGN PATENT DOCUMENTS

| | | | |
|---|---|---|---|
| 2269185 | 12/1975 | France | 361/8 |
| 541211 | 1/1977 | U.S.S.R. | 361/3 |

*Primary Examiner*—Harry E. Moose, Jr.
*Attorney, Agent, or Firm*—John E. Hoel

[57] ABSTRACT

A DC arc suppression circuit is disclosed for suppressing arcs which occur across a mechanical switch or circuit breaker. Several embodiments are described which employ a bipolar transistor to actively shunt the load current around the mechanical switch when the contacts are opened for a period of time long enough to enable the contacts to be separated by a sufficient distance to prevent arcing. Arcing is prevented when contact bounce occurs upon closure of the contacts, by providing a diode connected in parallel with the base-emitter portion of the circuit which restores the arc suppressing capacity of the circuit almost immediately upon the first closure of the contacts.

6 Claims, 7 Drawing Figures

TWO TERMINAL SUPPRESSOR

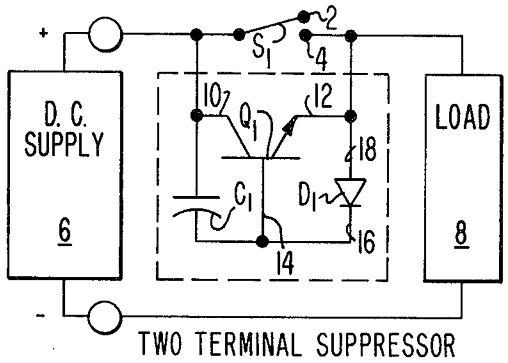
FIG. 1 WITH NPN TRANSISTOR
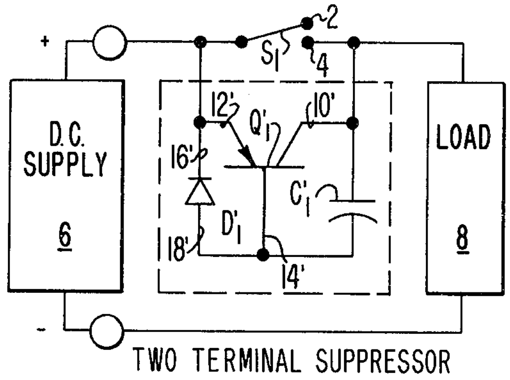
FIG. 2 WITH PNP TRANSISTOR
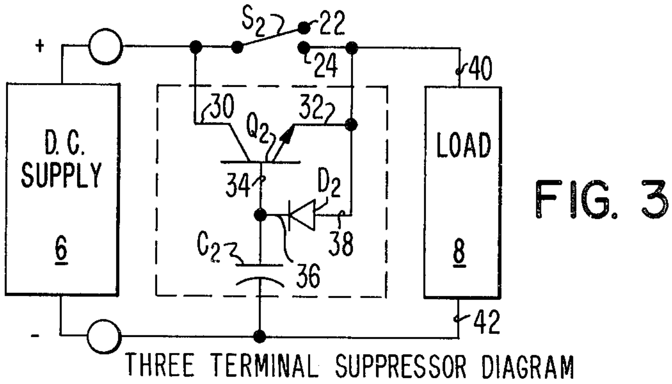
FIG. 3

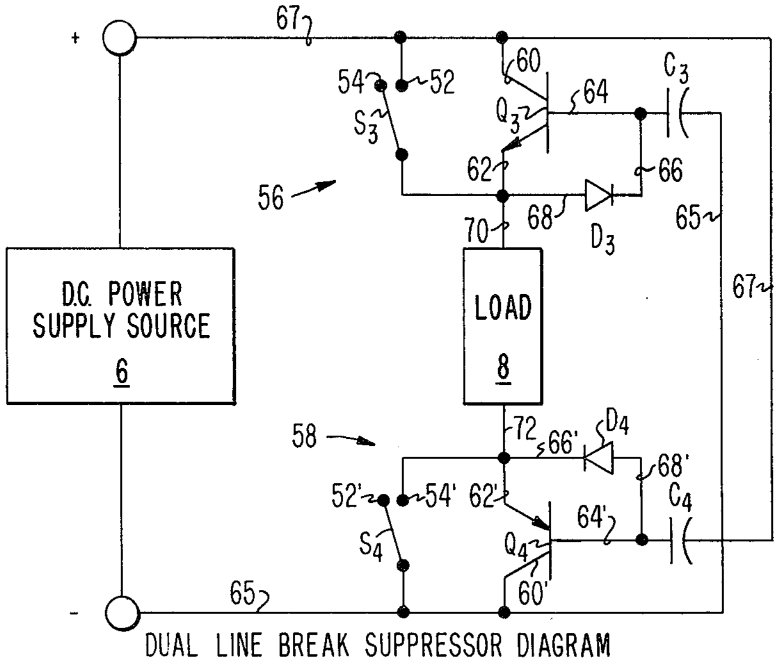
FIG. 4
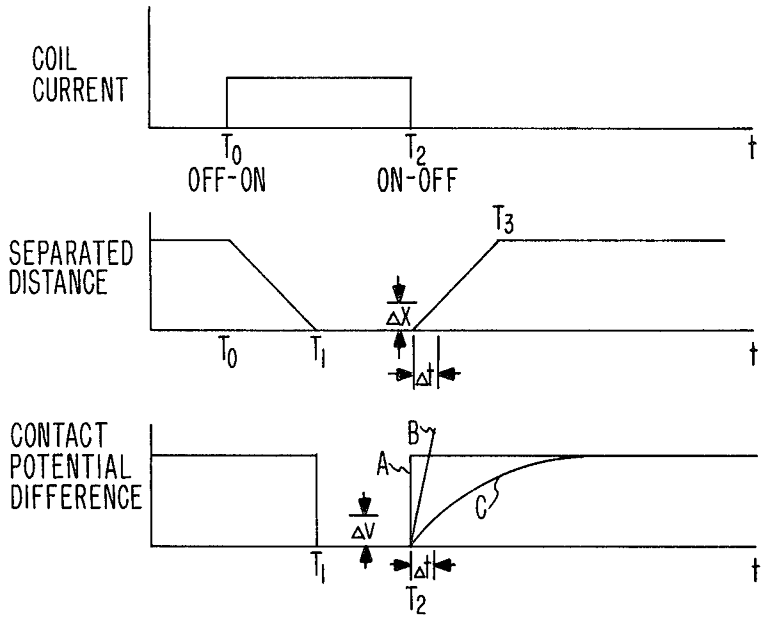
FIG. 5a
FIG. 5b
FIG. 5c

ACTIVE ARC SUPPRESSION FOR SWITCHING OF DIRECT CURRENT CIRCUITS

FIELD OF THE INVENTION

The invention disclosed broadly relates to arc suppression circuits and more particularly relates to active arc suppression for switching of direct current circuits.

BACKGROUND OF THE INVENTION

There is a significant need for controlling high voltage direct current with a physically small switching device, such as a relay. The problem involved in satisfying this need, however, is that as the contacts of a relay are opened or closed, the electrical discharge created by the interruption of the electrical current due to contact bounce or the opening of the contacts causes heating which burns and erodes the electrodes, leading to welding and destruction of the relay contacts. A number of attempts have been made in the prior art to solve this or similar problems. For example, U.S. Pat. No. 4,250,531 to Ahrens discloses a switch-arc preventing circuit which employs a varistor in shunt connection across the power electrodes of the switching transistor to limit inductive spikes. A defect of this approach is that the relay is not actually controlling the power but is instead providing a control signal to power switching transistors. Power switching transistors cannot handle the high power switching requirements which currently exist. Another approach attempting to solve the arc suppression problem is shown in U.S. Pat. No. 3,912,941 to Passarella, which discloses an isolation circuit for arc reduction in a DC circuit. This circuit employs a transistor in which the collector and emitter are connected in series with the power supply and the load while the base is connected through a resistive gating circuit to the switch. Once again, the transistor switch switching contacts are isolated from the load are not arc suppressed. And furthermore, the load current is limited by the transistor switch. Still a further attempt to solve the arcing problem is described in U.S. Pat. No. 3,184,619 to Zydney, which discloses a contact noise suppressor. When the contacts open, the negative potential provided by the source is disconnected from the load circuit. Contact bounce, however, is not arc suppression and the patented device serves only to reduce load sensitivity to erratic closure or bounce of the contacts and does not serve to suppress the arcing associated with switching large direct current power. The disclosed circuit is basically a pulse stretcher which is configured for normally closed contacts and does not effectively suppress arcs. Furthermore, the timing for the circuit is controlled by a resistor and is relatively slow and cannot provide for a rapid recovery to defeat contact bounce effects. Another attempt of solving the problem of arc suppression has been described in U.S. Pat. No. 3,075,124 to Bagno, which discloses a contact protection circuit which is connected in series between the power supply and the protected contacts. The protective circuit must pass all power through the active device and therefore arc suppression upon opening of the contacts would be almost nonexistent. This is because charges are stored in the active devices and thus they cannot reduce the energy at the contacts unless there is a very low power level.

In summary, the prior art has been unable to provide an adequate solution to the problem of active arc suppression for switching DC current circuits.

OBJECTS OF THE INVENTION

It is therefore an object of the invention to provide an active arc suppression circuit for switching direct current.

It is still another object of the invention to provide an active arc suppression circuit which effectively suppresses arcs during the opening and closing of mechanical contacts switching direct current.

It is still a further object of the invention to provide an improved arc suppression circuit capable of handling larger magnitudes of direct current than has been available in the prior art.

SUMMARY OF THE INVENTION

These and other objects, features and advantages of the invention are accomplished by the active arc suppression circuit disclosed herein. A DC arc suppression circuit is disclosed for suppressing arcs which occur across a mechanical switch or circuit breaker. Several embodiments are described which employ a bipolar transistor to actively shunt the load current around the mechanical switch when the contacts are opened for a period of time long enough to enable the contacts to be separated by a sufficient distance to prevent arcing. Arcing is prevented when contact bounce occurs upon closure of the contacts, by providing a diode connected in parallel with the base-emitter portion of the circuit which restores the arc suppressing capacity of the circuit almost immediately upon the first closure of the contacts.

DESCRIPTION OF THE FIGURES

These and other objects, features and advantages of the invention will be more fully appreciated with reference to the accompanying figures.

FIG. 1 is a first embodiment of the invention, using an NPN transistor.

FIG. 2 is another illustration of the first embodiment of the invention, using a PNP transistor.

FIG. 3 is a second embodiment of the invention.

FIG. 4 is a third embodiment of the invention.

FIG. 5 is a waveform diagram illustrating the operation of the invention.

DISCUSSION OF THE PREFERRED EMBODIMENT

A DC arc suppression circuit is disclosed for suppressing arcs which occur across a mechanical switch or circuit breaker. Several embodiments are described which employ a bipolar transistor to actively shunt the load current around the mechanical switch when the contacts are opened for a period of time long enough to enable the contacts to be separated by a sufficient distance to prevent arcing. Arcing is prevented when contact bounce occurs upon closure of the contacts, by providing a diode connected in parallel with the baseemitter portion of the circuit which restores the arc suppressing capacity of the circuit almost immediately upon the first closure of the contacts.

The first embodiment of the invention is shown in FIG. 1 for an NPN transistor and in FIG. 2 for a PNP transistor. The active arc suppression circuit of FIG. 1 is connected in parallel with the first and second contacts 2 and 4 of a relay switch S1 which is to be protected while switching large magnitude DC currents. The relay switch S1 has a characteristic delay for the opening of its contacts. The relay switch S1 has a first contact 2 connected to the positive terminal of the DC power supply 6 and the second contact 4 is connected to the load 8.

The circuit shown in FIG. 1 has an NPN bipolar transistor Q1 which has its collector 10 connected to the first contact 2 of the switch S1 and its emitter 12 connected to the second contact 4 of the switch S1. The circuit further includes the capacitor C1 which is connected between the collector 10 and the base 14 of the transistor Q1. The capacitor C1 has a capacitance which is sufficiently large so that base current which flows into the base 14 of the transistor Q1 from the capacitor C1 will have a characteristic time constant which is longer than the characteristic delay for contact opening of the switch S1, before the capacitor can charge up. The capacitor C1 passes the load current from the first contact 2 to the base 14 of the transistor Q1 when the contacts are opened, turning on the transistor Q1 so as to shunt the load current around the contacts 2 and 4 of the switch S1 until the capacitor C1 charges up after the characteristic delay, at which time the transistor will turn off.

The circuit of FIG. 1 further includes the diode D1 which has its cathode 16 connected to the base 14 of the transistor Q1 and its anode 18 connected to the emitter 12 of the transistor Q1. The diode D1 will quickly discharge the capacitor C1 when the contacts 2 and 4 of the switch S1 are closed. In this manner, the capacitor C1 can be rapidly recharged upon contact opening and this enables the circuit of FIG. 1 to rapidly suppress additional arcs which may be generated upon contact bounce after the initial closure of the contacts.

The time constant associated with the capacitor C1 discharging through the base of the transistor Q1, is selected to be sufficiently long so that the transistor Q1 will be maintained in its conductive state while the contacts 2 and 4 of the switch S1 are opening, for a sufficient duration so that after the capacitor C1 is no longer able to supply base current to the transistor Q1, causing the transistor to turn off, the switch contacts 2 and 4 for S1 will be sufficiently separated so that no arc will be capable of passing between the contacts.

The circuit of FIG. 2 operates on the same principles as that described for the circuit of FIG. 1, however the polarity of the transistor Q1 is changed from the NPN transistor of FIG. 1 to the PNP transistor Q1′ of FIG. 2.

The active arc suppression circuit of FIG. 2 is connected in parallel with the first 2 and second 4 contacts of the relay switch S1 which is to be protected while switching large DC currents. The switch S1 has a characteristic delay for opening its contacts. The switch S1 also has its first contact 2 connected to the positive terminal of the DC power supply 6 and its second contact 4 connected to the load 8.

As is shown in FIG. 2, the PNP bipolar transistor Q1′ has its emitter 12′ connected to the first contact 2 and its collector 10′ connected to the second contact 4 of the switch S1. The capacitor C1′ is connected between the collector 10′ and the base 14′ of the transistor Q1′. The capacitor C1′ has a capacitance which is sufficiently large so as to require an interval of time longer than the characteristic delay for contact opening of the switch S1, in order to charge up by passing current through the base 14′ of the transistor Q1′. The capacitor C1′ passes the potential of the load 8 from the second contact 4 to the base 14′ of the transistor Q1′ when the contacts 2 and 4 of the switch S1 are opened. This turns on the transistor Q1′ so as to shunt the load current around the contacts 2 and 4 of the switch S1 until the capacitor C1′ is able to charge up from the base current of the transistor Q1′, after the characteristic delay time. After the capacitor has charged up, the transistor Q1′ will turn off.

The diode D1′ shown in FIG. 2 has its anode 18′ connected to the base 14′ and its cathode 16′ connected to the emitter 12′ of the transistor Q1′, for quickly discharging the capacitor C1′ when the contacts 2 and 4 of the switch S1 are closed. In this manner, the active arc suppression circuit can rapidly recover upon the closure of the contacts, so as to be immediately able to suppress a second arc which may occur upon contact bounce after the first closure.

It can be seen from the symmetry of the circuit shown in FIG. 1 that the first contact 2 of the arc suppression circuit can be connected to the load 8 device and the second contact 4 can be connected to the negative terminal of the DC power supply 6. Similarly, it can be seen from the symmetry of the circuit shown in FIG. 2 that the first contact 2 therein can be connected to the load 8 and the second contact 4 may be connected to the negative terminal of the DC power supply 6. In both instances, the circuits will operate in a manner similar to that described above for FIGS. 1 and 2.

A second embodiment of the invention is shown in FIG. 3 wherein the active arc suppression circuit is connected in parallel with the first 22 and second 24 contacts of the relay switch S2 which is to be protected while switching large DC currents. The switch S2 has a characteristic delay for opening its contacts so that its contacts 22 and 24 will be separated far enough apart such that an arc will no longer be sustained between them. The switch S2 has the first contact 22 connected to the positive terminal of the DC power supply 6 shown in FIG. 3 and has the second contact 24 connected to the first side 40 of the load 8 shown in FIG. 3, the second side 42 of the load 8 being connected to the negative terminal of the power supply 6 of FIG. 3.

The circuit of FIG. 3 includes an NPN bipolar transistor Q2 which has its collector 30 connected to the first contact 22 and its emitter 32 connected to the second contact 24 of the switch S2 in FIG. 3. A capacitor C2 in FIG. 3 is connected between the base 34 of the transistor Q2 and the negative terminal of the power supply 6. The diode D2 in FIG. 3 has its cathode 36 connected to the base 34 and its anode 38 connected to the emitter 32 of the transistor Q2, for charging the capacitor C2 when the contacts 22 and 24 of the switch S2 are closed.

The capacitor C2 will provide base current to the transistor Q2 when the contacts 22 and 24 of the switch S2 are opened, turning on the transistor Q2 so as to shunt the load current around the contacts of the switch S2 until the capacitor C2 discharges after the characteristic delay of the switch S2. After that time, the transistor Q2 will turn off. The capacitance of the capacitor C2 is selected so that the characteristic time constant for current from the discharging of the capacitor C2 through the base 34 of the transistor Q2 will be longer than the characteristic delay of the switch S2 required for the contacts 22 and 24 of the switch S2 to open to a sufficiently large distance so that an arc will no longer be sustained.

The diode D2 will quickly charge the capacitor C2 when the contacts 22 and 24 of the switch S2 are closed, thereby enabling the circuit shown in FIG. 3 to quickly respond to contact bounce after the first closure, suppressing any second and subsequent arcs which might have otherwise occurred.

A third embodiment of the invention is shown in FIG. 4, having two subcircuits 56 and 58 which serve to isolate the load 8 from both the positive terminal 67 and the negative terminal 65 of the power supply 6.

The active arc suppression circuit of FIG. 4 has the first subcircuit 56 connected in parallel with the first and second contacts 54 and 52 of a first relay switch S3 which is to be protected. The active arc suppression circuit of FIG. 4 also has a second subcircuit 58 which is connected in parallel with the first and second contacts 52' and 54' of the second relay switch S4 which is to be protected while switching DC currents. The first switch S3 and the second switch S4 each have a characteristic delay for opening their respective contacts. This characteristic delay is the time required for the contacts to open to a sufficient distance so that an arc can no longer be sustained. The first switch S3 has its first contact 54 connected to a first side 70 of the load device 8 and its second contact 52 connected to the positive terminal 67 of the DC power supply 6. The second switch S4 has its first contact 52' connected to the negative terminal 65 of the DC power supply 6 and its second contact 54' connected to a second side 72 of the load 8, as is shown in FIG. 4.

An NPN bipolar transistor Q3 is included in the first subcircuit 56, having its collector 60 connected to the second contact 52 and its emitter connected to the first contact 54 of the switch S3, as is shown in FIG. 4. A capacitor C3 in the first subcircuit of FIG. 4, is connected between the base 64 of the transistor Q3 and the negative terminal 65 of the DC power supply. The diode D3 of the first subcircuit 56 of FIG. 4, has its anode 68 connected to the emitter 62 and its cathode 66 connected to the base 64 of the first transistor Q3, for charging the first capacitor C3 when the first switch S3 has its contacts closed.

The first capacitor C3 provides a base current to the first transistor Q3 when the contacts of the switch S3 are opened, turning on the first transistor Q3 so as to shunt the load current around the contacts 52 and 54 of the first switch S3 until the first capacitor C3 charges up after the characteristic delay, after which time the first transistor Q3 then turns off.

The first diode D3 will quickly charge the capacitor C3 when the contacts 52 and 54 of the switch S3 are closed, thereby enabling the first subcircuit 56 to quickly respond to subsequent contact bounce after the first closure of the switch S3, thereby suppressing second and subsequent potential arcs.

The second subcircuit 58 of the active arc suppression circuit of FIG. 4 includes the PNP bipolar transistor Q4 which has its collector 60' connected to the first contact 52' of the second switch S4 and its emitter 62' connected to the second contact 54' of the second switch S4. As is shown in FIG. 4, a second capacitor C4 in the second subcircuit 58 is connected between the base 64' of the second transistor Q4 and the positive terminal 67 of the DC power supply 6. A second diode D4 in the second subcircuit 58 of FIG. 4 has its anode 68' connected to the base 64' of the second transistor Q4 and its cathode 66' connected to the emitter 62' of the second transistor Q4, for charging the second capacitor C4 when the second switch S4 is closed.

The second capacitor C4 will provide a base current to the base 64' of the second transistor Q4 when the contacts 52' and 54' of the second switch S4 are opened, thereby turning on the second transistor Q4 so as to shunt the load current around the contacts 52' and 54' of the second switch S4 until the second capacitor C4 charges up after the characteristic delay, after which time the second transistor Q4 will turn off.

The second diode D4 will quickly charge the capacitor C4 when the contacts 52' and 54' of the switch S4 are closed, thereby enabling the second subcircuit 58 of the active arc suppression circuit of FIG. 4 to rapidly respond after the first closure of the contacts for S4, so as to be capable of suppressing second and subsequent arcs which may occur upon contact bounce after the initial closure of the contacts 52' and 54' for the switch S4.

OPERATION OF THE INVENTION

The operation of the invention is illustrated with reference to the curves shown in FIG. 5. Waveform diagram (a) in FIG. 5 is a waveform diagram of the coil current through the relay, at time T0 the relay current is turned on and at time T2 the relay current is turned off. In the waveform diagram (b) of FIG. 5, the separation distance between the contacts of the relay is plotted as a function of time. At the time T1 following the time T0, the magnetic flux in the relay coil has built up sufficiently to completely close the contacts at the time T1. At the time T2, when the magnetic flux in the relay coil begins to collapse as a result of turning off the coil current, the separation distance between the contacts begins to increase and the contacts are fully open at time T3. As can be seen in waveform diagram (c) of FIG. 5, the potential difference between the contacts abruptly changes from the full power supply potential to zero potential at time T1, when the contacts are closed. In the first instance without the circuit disclosed herein, curve A in waveform diagram (c) illustrates the abrupt increase in the potential difference between the contacts at the time T2 when the contacts just begin to open. This abrupt increase in the potential difference across the contacts creates a field strength in the region between the contacts which is greater than that field strength required for arc break-over. The field strength required for arc break-over as a function of time in this relay is illustrated by the curve B shown in waveform diagram (c). It is the object of the suppressor circuit disclosed herein to retard the rate of the buildup in the potential difference across the contacts of the relay such that the field strength between the contacts is always less than that represented by curve B. This is illustrated by curve C in waveform diagram (c) of FIG. 5, which shows the resultant potential difference across the contacts which occurs with the use of the suppressor circuit disclosed herein. It can be seen that at all times following T2, the potential difference across the contacts is less than that which would be necessary to cause break over, thereby protecting the contacts of the relay. The following illustrative example of specific values for the circuit results in the desired operation illustrated in the curve C of the waveform diagram (c) of FIG. 5.

Example values are given for the components in the circuit of FIG. 3. Assume a 1 ohm resistive load 8 and a 25 volt DC power supply 6, resulting in a 25 ampere current flowing through the contacts of relay S2. The transistor Q2 is a Darlington with a gain of approximately 1000. The base current to transistor Q2 to make it shunt the load current will be the load current divided by the gain, or 25 milliamperes. This current must be supplied by the capacitor C2 during its decay or growth. C2 must be of a size such that there will be a delay sufficient to maintain the voltage growth across the contacts below that which is necessary to cause arcing or continue arcing. Assume in this example that the relay contacts for S2 will be separated by a distance sufficient to prevent an arc break-over in less than 1 millisecond after the contacts begin to separate. A capacitor C2 of 1 microfarad will require approximately 1 millisecond to discharge in the example circuit, which would allow the desired control of the rate of voltage growth across the contacts of S2, as shown in curve C of waveform diagram (c) of FIG. 5.

The active arc suppression circuit shown in the above three embodiments, improves the contact life span and reliability of mechanical relay contacts which must switch large DC currents, by eliminating contact arcing through the gradual reduction of the load current when the relay contacts are opened, without the interruption of the full load current and the full supply potential, which would otherwise produce a significant arc across the contacts.

The circuit described in the above three embodiments enables the use of small relays for direct current switching at their full AC voltage and current ratings, something not previously possible in the prior art. Virtually no power is dissipated by the relay when protected by the above-described circuits, in contrast to solid-state relays, for example, which dissipate significant amounts of power and are more costly in addition to being limited in their power handling capacity.

Still further, the electrical noise and radiated energy which are typically emitted by solid-state relays or by mechanical relays which do not have sufficient arc suppression, is heavily suppressed by the above-described circuits, as a direct result of the softer turn-off of the load current by the protective circuit described above. Inductive loads do not need clamping diodes to limit the inductive kick associated with turning them off, when the above-described circuits are employed to protect the relay contacts. Furthermore, the ability to inhibit arcing on the switching of direct current power allows relays and all other switching components to be physically smaller since there is no need to extinguish an arc normally formed when the contacts of the relay are opened.

Although specific embodiments of the invention have been disclosed, it will be understood by those of skill in the art that the foregoing and other changes in form and details may be made therein without departing from the spirit and the scope of the invention.

Having thus described our invention, what we claim as new, and desire to secure by Letters Patent is:

1. An active arc suppression circuit connected in parallel with a first and second contacts of a relay switch to be protected while switching DC currents, said switch having a characteristic delay for opening said contacts and having said first contact connected to the positive terminal of a DC power supply and said second contact connected to a load, comprising:

an NPN bipolar transistor having its collector connected to said first contact and its emitter connected to said second contact, and a base;

a capacitor connected between said collector and said base of said transistor having a capacitance sufficiently large to require an interval longer than said characteristic delay to charge up, for passing load current from said first contact to said base when said contacts are opened, turning on said transistor to shunt said load current around said contacts until said capacitor charges up after said characteristic delay, at which time said transistor turns off;

a diode having its cathode connected to said base and its anode connected to said emitter of said transistor, for quickly discharging said capacitor when said contacts are closed;

whereby arcs which may occur across said contacts upon opening are suppressed.

2. An active arc suppression circuit connected in parallel with the first and second contacts of a relay switch to be protected while switching DC currents, said switch having a characteristic delay for opening said contacts and having said first contact connected to the positive terminal of a DC power supply and said second contact connected to a load, comprising:

a PNP bipolar transistor having its emitter connected to said first contact and its collector connected to said second contact, and a base;

a capacitor connected between said collector and said base of said transistor, having a capacitance sufficiently large to require an interval longer than said characteristic delay to charge up, for passing the potential of said load from said second contact to said base when said contacts are opened, turning on said transistor to shunt said load current around said contacts until said capacitor charges up after said characteristic delay, at which time said transistor turns off;

a diode having its anode connected to said base and its cathode connected to said emitter of said transistor, for quickly discharging said capacitor when said contacts are closed;

whereby arcs which may occur across said contacts upon opening are suppressed.

3. The apparatus of claim 1 wherein said first contact is connected to said load device and said second contact is connected to the negative terminal of a DC power supply.

4. The apparatus of claim 2 wherein said first contact is connected to said load and said second contact is connected to the negative terminal of a DC power supply.

5. An active arc suppression circuit connected in parallel with the first and second contacts of a relay switch to be protected while switching DC currents, said switch having a characteristic delay for opening said contacts and having said first contact connected to the positive terminal of a DC power supply and said second contact connected to a first side of a load, the second side of said load being connected to the negative terminal of said power supply, comprising:

an NPN bipolar transistor having its collector connected to said first contact and its emitter connected to said second contact, and a base;

a capacitor connected between said base of said transistor and said negative terminal of said power supply;

a diode having its cathode connected to said base and its anode connected to said emitter of said transistor for charging said capacitor when said contacts are closed;

said capacitor providing base current to said transistor when said contacts are opened, turning on said transistor to shunt said load current around said contacts until said capacitor discharges after said characteristic delay, at which time said transistor turns off;

said diode quickly charging said capacitor when said contacts are closed;

whereby arcs which may occur across said contacts upon opening are suppressed.

6. An active arc suppression circuit having a first subcircuit connected in parallel with the first and second contacts of a first relay switch to be protected and a second subcircuit connected in parallel with the first and second contacts of a second relay switch to be protected while switching DC currents, said first switch and second switch having a characteristic delay for opening said contacts, said first switch having said first contact connected to a first side of a load device and said second contact thereof connected to the positive terminal of a DC power supply and said second switch having said first contact thereof connected to the negative terminal of said DC power supply and said second contact thereof connected to a second side of said load, comprising:

an NPN bipolar transistor in said first subcircuit having its collector connected to said second contact and its emitter connected to said first contact, and a base;

a capacitor of said first subcircuit connected between said base of said transistor and said negative terminal of said power supply;

a diode of said first subcircuit having its anode connected to said emitter and its cathode connected to said base of said first transistor for charging said first capacitor when said first switch contacts are closed;

said first capacitor providing base current to said first transistor when said contacts are opened, turning on said first transistor to shunt said load current around said contacts of said first switch until said first capacitor charges up after said characteristic delay, at which time said first transistor turns off;

said first diode quickly charging said first capacitor when said contacts are closed;

a PNP bipolar transistor in said second subcircuit having its collector connected to said first contact of said second switch and its emitter connected to said second contact of said second switch and a base;

a second capacitor in said second subcircuit connected between said base of said second transistor and said positive terminal of said power supply;

a second diode in said second subcircuit having its anode connected to said base of said second transistor and its cathode connected to said emitter of said second transistor for charging said second capacitor when said second switch is closed;

said second capacitor providing base current to the base of said second transistor when said second contacts are opened, turning on said second transistor to shunt said load current around said contacts of said second switch until said second capacitor charges up after said characteristic delay, at which time said second transistor turns off;

said second diode quickly charging said second capacitor when said contacts of said second switch are closed;

whereby arcs which may occur across said contacts of said first and second switches are suppressed.

* * * * *